United States Patent
Lau et al.

(10) Patent No.: US 9,589,161 B1
(45) Date of Patent: Mar. 7, 2017

(54) SUBSTRATE WITH ELECTRICALLY CONDUCTIVE PATTERNS THAT ARE READABLE

(71) Applicant: Kazoo Technology (Hong Kong) Limited, Hong Kong (CN)

(72) Inventors: Pak Tao Alan Lau, Hong Kong (CN); Kin Chung Kendall Lo, Hong Kong (CN)

(73) Assignee: Kazoo Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 15/153,733

(22) Filed: May 13, 2016

(51) Int. Cl.
  *G06K 7/06* (2006.01)
  *G06K 7/00* (2006.01)
  *G06K 19/077* (2006.01)
  *G06F 3/044* (2006.01)

(52) U.S. Cl.
  CPC ............ *G06K 7/006* (2013.01); *G06F 3/044* (2013.01); *G06K 19/0772* (2013.01)

(58) Field of Classification Search
  CPC  G06K 7/06; G06K 5/00; G06K 19/00; G06K 19/06; G06F 17/00
  USPC ......................... 235/441, 380, 375, 487, 492
  See application file for complete search history.

(56) References Cited

U.S. PATENT DOCUMENTS

| | | | |
|---|---|---|---|
| 8,497,850 B2 | 7/2013 | Foerster et al. | |
| 2009/0071694 A1* | 3/2009 | Pawel .................. | H05K 1/0256 174/250 |
| 2012/0125993 A1 | 5/2012 | Thiele et al. | |
| 2012/0306813 A1 | 12/2012 | Foerster et al. | |
| 2013/0072303 A1 | 3/2013 | Mineur | |
| 2013/0115878 A1 | 5/2013 | Thiele et al. | |
| 2013/0284578 A1 | 10/2013 | Foerster et al. | |
| 2014/0111469 A1 | 4/2014 | Foerster et al. | |
| 2014/0120995 A1 | 5/2014 | Duplat | |
| 2014/0198062 A1 | 7/2014 | Kreutzer et al. | |
| 2015/0302226 A1* | 10/2015 | Li ..................... | G06K 19/07749 235/451 |

FOREIGN PATENT DOCUMENTS

| | | | | |
|---|---|---|---|---|
| CN | 1378693 | 11/2002 | | |
| CN | 1802656 | 7/2006 | | |
| CN | 102066082 | 5/2011 | | |
| CN | 102187349 | 9/2011 | | |
| CN | 103038784 | 4/2013 | | |
| CN | 103250164 | 8/2013 | | |
| CN | 103733164 | 4/2014 | | |
| CN | WO 2015113365 A1 * | 8/2015 | ............ | G06F 3/033 |
| EP | 2458526 | 5/2012 | | |
| WO | WO2012095586 | 7/2012 | | |
| WO | WO2012095587 | 7/2012 | | |
| WO | WO2013107957 | 7/2013 | | |

* cited by examiner

*Primary Examiner* — Edwyn Labaze
(74) *Attorney, Agent, or Firm* — Eagle IP Limited; Jacqueline C. Lui

(57) ABSTRACT

One embodiment is a flat card that includes an electrically non-conductive substrate and a plurality of electrical conductors disposed on a surface of the non-conductive substrate. The conductors are connected together to form patterns of conductive lines connected to conductive geometric shapes located at ends of the conductive lines. A switch is positioned between two of the conductive geometric shapes and switchable between an open state and a closed state.

20 Claims, 8 Drawing Sheets

SUBSTRATE WITH ELECTRICALLY CONDUCTIVE PATTERNS THAT ARE READABLE

FIELD OF THE INVENTION

The present invention relates to a method and system that includes a substrate with electrically conductive patterns that are readable with a touchscreen display.

BACKGROUND

There have been developments in storing and transmitting information via capacitive coupling between electronic cards and electronic devices with touchscreens. Information transmits from the card to the electronic device when the card is placed in contact with the touchscreen.

New methods and apparatus that store and transmit information via capacitive coupling will assist in advancing technological needs and solving technological problems.

SUMMARY OF THE INVENTION

Figure 1A:
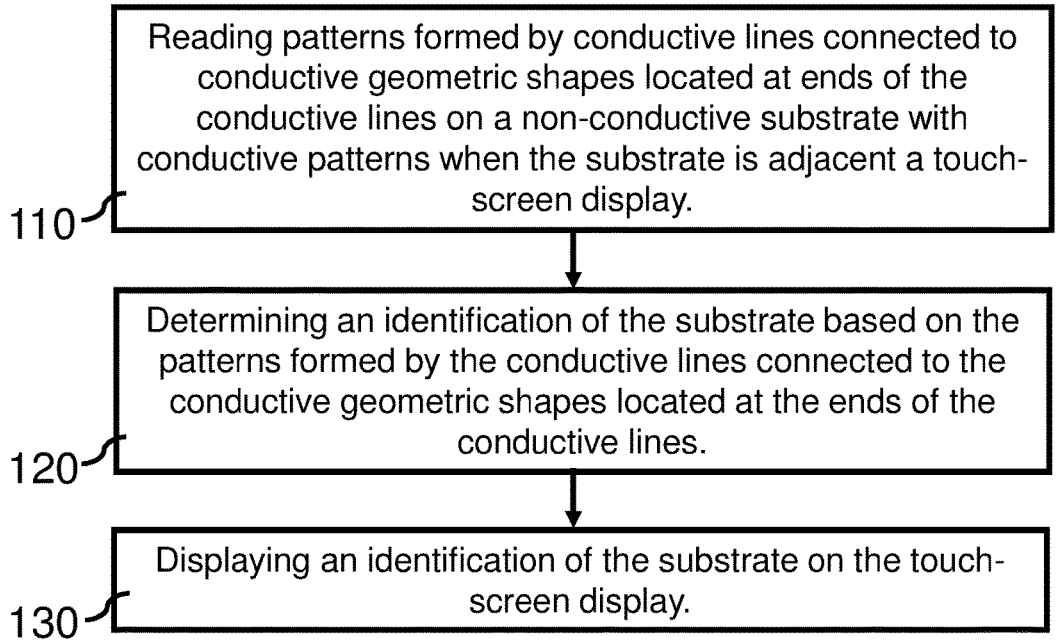
FIG. 1A shows a method executed by a reader to determine an identification of a substrate with conductive patterns in accordance with an example embodiment.

One example embodiment is a substrate with conductive patterns that includes an electrically non-conductive substrate and a plurality of electrical conductors disposed on a surface of the non-conductive substrate. The conductors are connected together to form patterns of conductive lines connected to conductive geometric shapes located at ends of the conductive lines. A switch is positioned between two of the conductive geometric shapes and switchable between an open state and a closed state.

Other example embodiments are discussed herein.

DETAILED DESCRIPTION

Example embodiments relate to apparatus and methods to determine information on a substrate with conductive patterns. The substrate includes one or more switches that turn on and off to change patterns of conductive areas that are readable by a capacitive touchscreen.

Touchscreen devices are in electronic devices such as game consoles, personal computers, tablet computers, electronic voting machines, and smartphones. These touchscreen devices can read information embedded in patterns formed on a nonconductive substrate of an example embodiment. This substrate includes one or more switches that can be activated and deactivated to change the patterns formed on the substrate and in turn change or alter information stored on the substrate.

The substrate of example embodiments includes various shapes and can be embodied or included with various types of electronic and non-electronic devices. By way of example, the substrate can be shaped as a flat or planar card, such as a business card, credit card, gaming card, or other handheld card. As another example, the substrate can be included with or embedded in product, such as embedded in a smartphone, embedded in a toy, attached to a cover or case, woven into a fabric of an article of manufacture, etc. As yet another example, the substrate can have various sizes and shapes, such as being curved or bent or foldable. A size and shape of the substrate can also vary depending on, for example, the number and type of switches, the amount of information being stored and/or transmitted, a location where the substrate will be used, whether the substrate includes a processor or controller, etc.

In an example embodiment, the substrate is embedded with electrical conductors that form touch points to simulate fingertips of a user touching a capacitive touchscreen. The touch points function as information carriers that can be read by the touchscreen and electronic devices with a touchscreen. By way of example, the substrate of example embodiments can be used in many fields, such as gaming, ticketing, member identifications, counterfeit protections, and other technological fields.

An example embodiment includes a non-conductive substrate with a plurality of electrical conductors and switches disposed on or in the non-conductive substrate. The electrical conductors are connected together to form patterns of conductive lines and conductive geometric shapes. These geometric shapes functions as touch points that activate locations on a capacitive touchscreen. The geometric shapes or touch points can be located at ends of the conductive lines or along the conductive lines.

Some capacitive touchscreens include an insulator (such as glass) that is coated with a transparent conductor. When an electrical conductor touches or comes close to the surface of the screen, an electrostatic field of the screen distorts and generates a measurable change in capacitance. A location of this change in capacitance is sent to a controller for processing.

The conductor on the touchscreen can be a human finger or other conductor, such as the geometric shapes or touch points located on the non-conductive substrate of an example embodiment. When the substrate touches or comes near the touchscreen, a capacitor is formed at each of the locations of the geometric shapes or touch points that are located on or in the substrate. These touch points emulate or simulate a person touching or otherwise activating the location on the touchscreen. The controller or processor in the electronic device determines the location of these shapes or points from a change in capacitances or change in voltage as measured from locations on the touchscreen, such as the corners or sides of the touchscreen. For example, each geometric shape or touch point generates a capacitor at a location formed by a row trace and a column trace of the touchscreen. A number of capacitive X-Y grid locations or intersections on the touchscreen can vary, depending on the type and size of the touchscreen.

In an example embodiment, one or more switches are positioned on or in electrical communication with the conductive lines and the touch points. The switches are switchable between an open position or state and a closed position or state. The switches can change or alter a configuration of a geometric patterned formed by the conductive lines and touch points and read by the touchscreen. The switches can also turn touch points on (e.g., when a switch connected to a touch point is in a closed position) and turn touch points off (e.g., when a switch connected to a touch point is in an open position).

The conductive geometric shapes or touch points can have various shapes, including but not limited to, one or more of a square, a circle, a triangle, a star and other polygon shapes. In an example embodiment, the touch point has a circular shape with a diameter of more than 0.4 centimeters, which allows a sufficient area to couple with the touchscreen device. In another example embodiment, the touch point has a diameter smaller than 0.4 centimeters, such as being a smaller circle or formed at an intersection of two conductive lines. For instance, the touch point has a diameter of 0.3 centimeters or greater, 0.2 centimeters or greater, or 0.1 centimeters or greater. As yet another example, a touch point occurs where two conductive lines cross. Further one of ordinary skilled in the art will appreciate that these example dimensions apply to circles and other shapes, such as triangles, squares, pentagons, ovals, ellipses, and other polygonal shapes and non-polygonal shapes.

The conductive lines and the touch points form a pattern that corresponds to a unique identification of the substrate. The pattern is changeable when one or more switches switch between the open state and the closed state. A user or electronic device is thus able to change an identity or information stored on a substrate by turning on and off one or more switches. Each unique pattern or switching configuration on the substrate can be associated with a unique identity or particular information. The switches can also be activated and deactivated (e.g., with a processor or controller located on the substrate) to transmit information to the touchscreen, such as transmitting bits, bytes, or blocks of data.

A number of unique patterns or configurations depends on a number of conductive lines and touch points. Consider an example in which a planar card has three touch points A, B and C with a conductive line disposed between A and B, and a conductive line disposed between B and C. Two switches P and Q are disposed on the two conductive lines, respectively. Switch P is placed between A and B, and switch Q is placed between B and C. By turning switch P and Q on and off, a total of four patterns can be formed by this configuration. One of ordinary skill in the art will appreciate that the number of patterns can vary depending on various factors, such as the number of switches, the configuration of the switches, the number of conductive lines, the number of touch points, and other factors.

FIG. 1A shows a method executed by an electronic device or reader with a touchscreen that determines an identification of a non-conductive substrate with conductive patterns.

Block 110 states reading patterns formed by conductive lines connected to conductive geometric shapes located at ends of the conductive lines on a non-conductive substrate when the substrate is adjacent a touchscreen.

Consider an example in which a planar card includes the non-conductive substrate with a plurality of switches that can be turned on and off to alter conductive patterns formed on the substrate. When the card is located on or near a touchscreen, the patterns on card activate locations on the touchscreen. Activation of these locations provides information to an electronic device that includes the touchscreen or that is in communication with it. The patterns formed on the card include one or more switches that are positioned between the conductive geometric shapes and are switchable between an open state and a closed state.

In one example embodiment, the switches include, but are not limited to, one or more of bipolar junction transistors (BJT), field effect transistors (FET), micro-electromechanical system (MEMS), optoelectronic switches, digital or mechanical relays, and any other switch mechanism that enables and disables electric current or voltage flow. As one example, the optoelectronic switch turns on or off when a ray of light is incident on the switch such that the two touch points located at ends of the conductive line are connected or disconnected to each other.

By way of example, open and closed states of each switch represent different patterns of the substrate. Each pattern corresponds to a unique identification of the substrate. Consider an example in which the substrate is a handheld portable card. The card is programmable to include particular information (such as information stored and retrieved in response to reading an identity of the card), certain rights or privileges (such as access rights or access privileges to an electronic device), user authentication, etc. By changing the pattern through the switches, more than one identification or unique set of information can be stored in or associated with the same card. A single card can thus have a higher data storing capacity.

In an example embodiment, additional data is stored in the substrate by switching the switches between on and off states in a specific time sequence. For example, turning on switch P followed by turning on switch Q corresponds to a different identification compared with turning on switch Q followed by turning on switch P.

Block 120 states determining an identification of the substrate based on the patterns formed by the conductive lines connected to the conductive geometric shapes located at the ends of the conductive lines.

As one example, the electric field at coordinates of the touchscreen display that are in contact with or adjacent to the conductive lines and the conductive geometric shapes is changed such that a pattern recognizer recognizes the pattern and determines the identification of the substrate.

Consider an example in which a geometric pattern of touch points on a card activates a plurality of X-Y grid locations on the touchscreen. A controller receives these activated grid locations and retrieves (e.g., from a lookup table or other memory) an identification of the card based on which grid locations were activated. This identification can also be based on which grid locations were not activated.

Block 130 states displaying an identification of the substrate on the touchscreen display.

Once the substrate is identified, the controller retrieves information associated with the identification. For instance, the touchscreen displays one or more images associated with the identification. As another example, the touchscreen activates, executes, or grants a user access to a software program associated with the identification. As another example, a monetary value stored on the substrate or associated with the substrate is displayed on the display in an instance in which the substrate is used for transactions involving payments of money, credits, or tokens such as payment as a credit card, payment as a near field communication (NFC) card, or payments for gaming applications. For instance, the substrate stores a unique number or identity that is associated to one or more monetary values stored on a server.

Figure 1B:
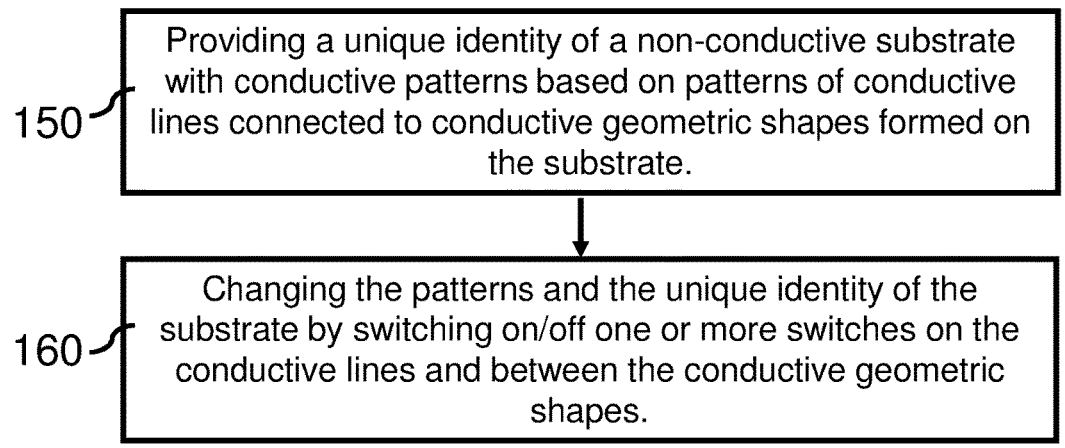
FIG. 1B shows a method to change geometric patterns on a substrate that is read by a capacitive touchscreen in accordance with an example embodiment.

FIG. 1B shows a method to change geometric patterns on a substrate that is read by a capacitive touchscreen.

Block 150 states providing a unique identity of a non-conductive substrate with conductive patterns based on patterns of conductive lines connected to conductive geometric shapes formed on the substrate.

As one example, a pattern recognizer in the touchscreen device compares the pattern that is read with pre-stored patterns in a database to determine the identity of the substrate.

Block 160 states changing the patterns and the unique identity of the substrate by switching on/off one or more switches on the conductive lines and between the conductive geometric shapes.

By way of example, each pattern corresponds to a unique identity of the substrate. The pattern is changeable when the switches switch between the open state and the closed state. For example, if a field effect transistor is used as the switch, the switching function will be done by changing the gate-source voltage.

Figure 2:
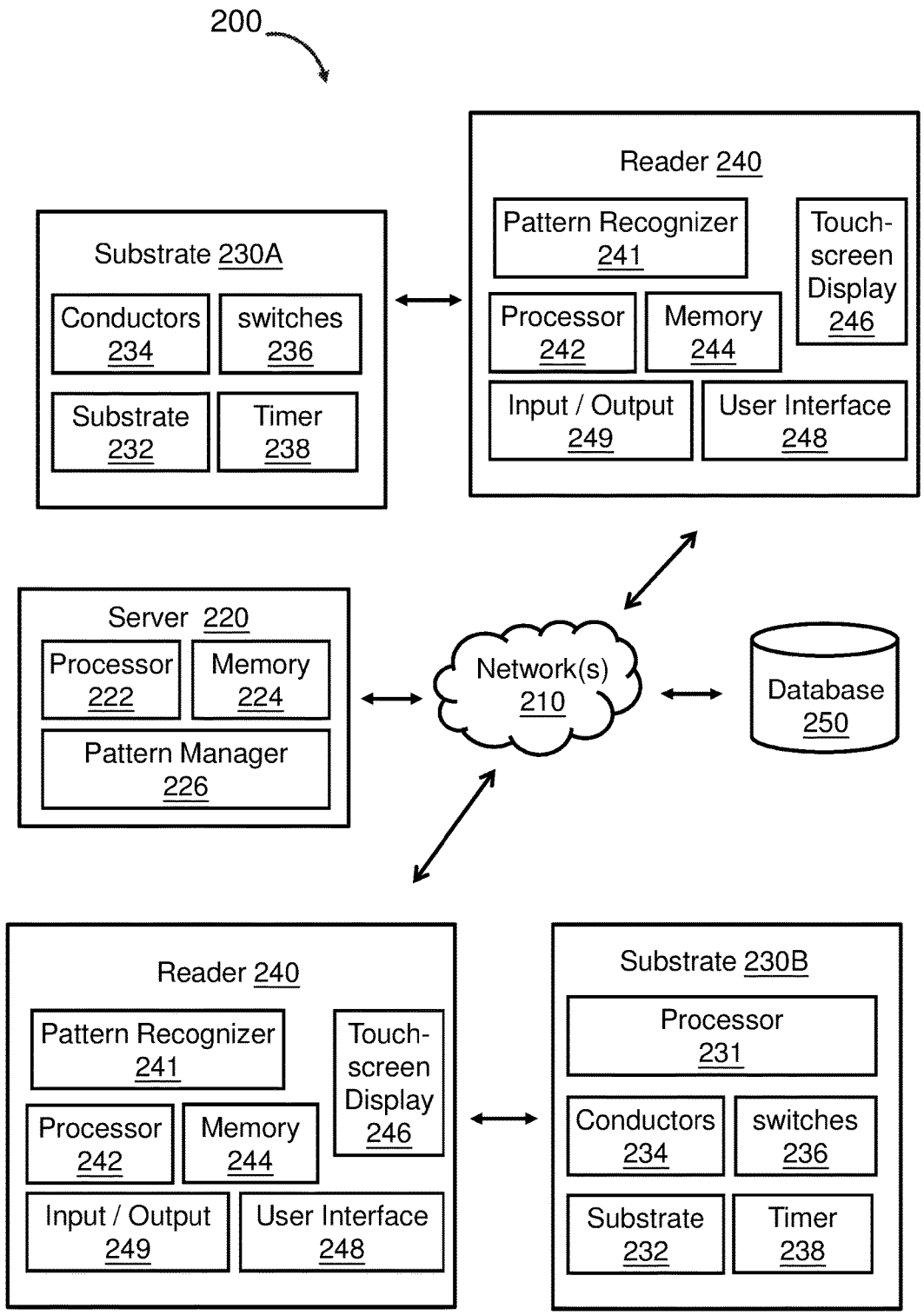
FIG. 2 shows an electronic system in accordance with an example embodiment.

FIG. 2 shows an electronic system 200 in accordance with an example embodiment. The electronic system 200 includes a server 220, a database 250, non-conductive substrates with conductive patterns 230A and 230B, and a reader 240. One or more elements in the electric system 200 can communicate with each other through one or more networks 210.

The networks 210 can include one or more of the internet, an intranet, an extranet, a cellular network, a local area network (LAN), a Wi-Fi network, a home area network (HAN), metropolitan area network (MAN), a wide area network (WAN), a Bluetooth network, public and private networks, etc.

The server 220 includes a processor 222 that communicates with a memory 224 and a pattern manager 226. By way of example, the processor 222 can be a microprocessor, central processing unit (CPU), or application-specific integrated circuit (ASIC) for controlling and/or receiving instructions or data from the memory 224 (such as random access memory (RAM), read only memory (ROM), and/or firmware). By way of example, the pattern manager stores a plurality of substrate patterns and/or information associated with unique identities of the substrates.

The non-conductive substrates with conductive patterns 230A and 230B each includes a substrate 232, a plurality of electrical conductors 234 disposed on a surface of the substrate, a plurality of switches 236 each positioned between two conductive geometric shapes and a timer 238. The conductors 234 are connected together to form patterns of conductive lines connected to conductive geometric shapes located at ends of the conductive lines. The switches 236 are switchable between an open state and a closed state. The substrate 230B further includes a processor 231 that communicates with the switches 236 and the timer 238.

By way of example, open and closed states of each switch represent different patterns of the substrate. In an example embodiment, additional data is stored in the substrate by switching the switches between on and off states in a specific time sequence.

In one example embodiment, an electronic timer records the duration of time that the substrate is located adjacent to the touchscreen display of the reader. The duration can be associated to the change of a specific valuation of the substrate, such as a monetary value and others relevant to the application concerned.

The reader 240 includes a controller or processor 242 that communicates with a pattern recognizer 241, a memory 244, a touchscreen display 246, a user interface 248 and an input/output (I/O) 249. By way of example, the pattern recognizer 241 reads the patterns formed on the surface of the substrate when the substrate is in contact with or adjacent to the touchscreen display 246. In an example embodiment, the user interface displays data or images associated with the card or applications authorized or executed upon reading the substrate.

Figure 3:
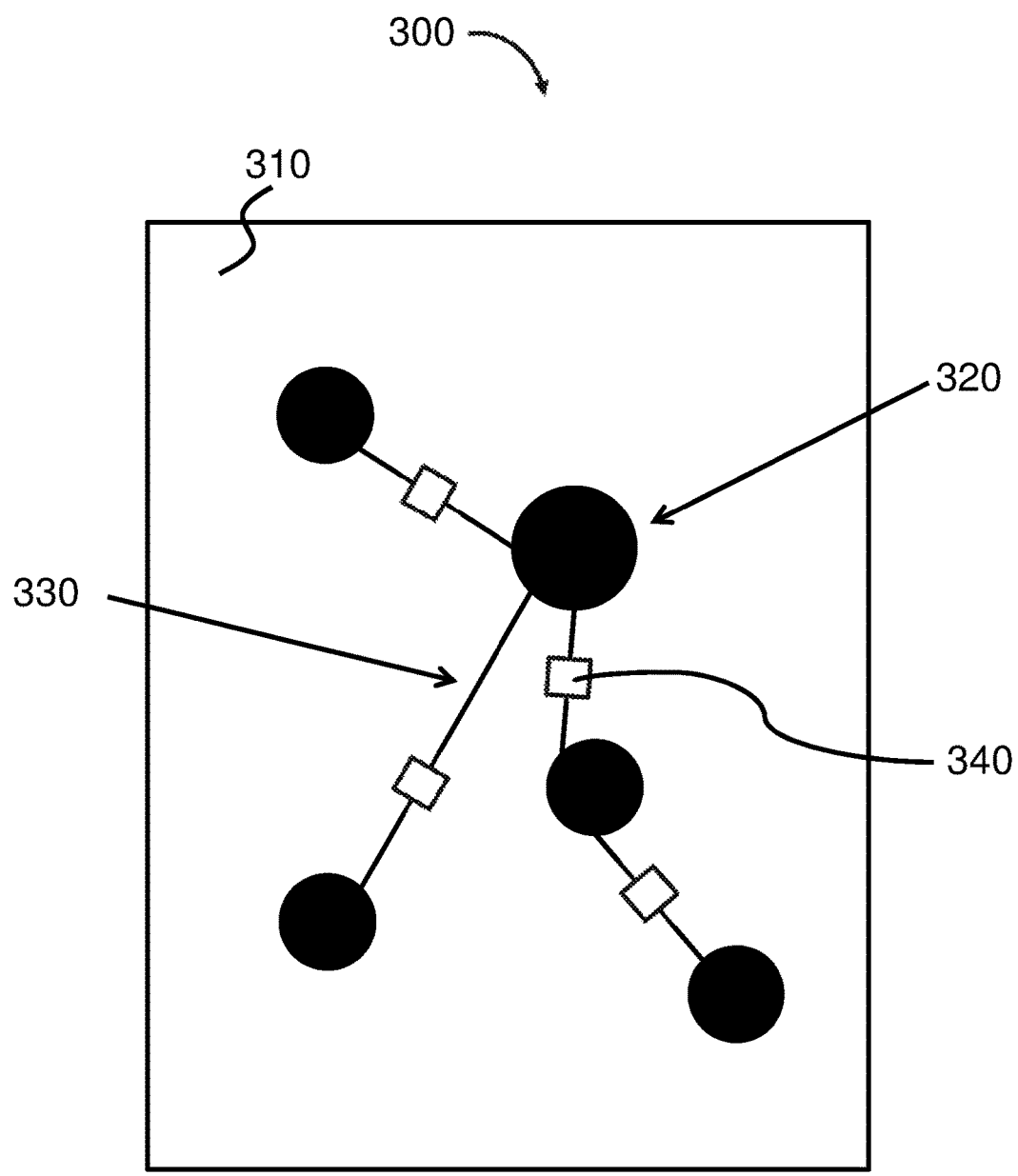
FIG. 3 shows a substrate with conductive patterns in accordance with an example embodiment.

FIG. 3 shows a non-conductive substrate with conductive patterns 300 in accordance with an example embodiment. The substrate 300 includes an electrically non-conductive substrate 310 and a plurality of electrical conductors disposed on a surface of the non-conductive substrate 310. The electrical conductors are connected together to form patterns of conductive lines 330 connected to conductive geometric shapes or touch points 320 located at ends of the conductive lines 330. A plurality of switches 340 are positioned between the conductive geometric shapes 320. The switches are switchable between an open state and a closed state.

As one example, the conductive lines and the conductive geometric shapes form a pattern that corresponds to a unique identification of the substrate. The pattern is changeable when the switches switch between the open state and the closed state. A number of unique identifications can increase by increasing a number of geometric shapes and/or switches.

As one example, when the substrate is placed against or adjacent a touchscreen display of a reader, the patterns formed on the substrate effect changes of an electric field at coordinates of the touchscreen display where the conductive lines and/or the conductive geometric shapes are located. The pattern recognizer of the reader recognizes the pattern based on the change of the electric field.

Figure 4:
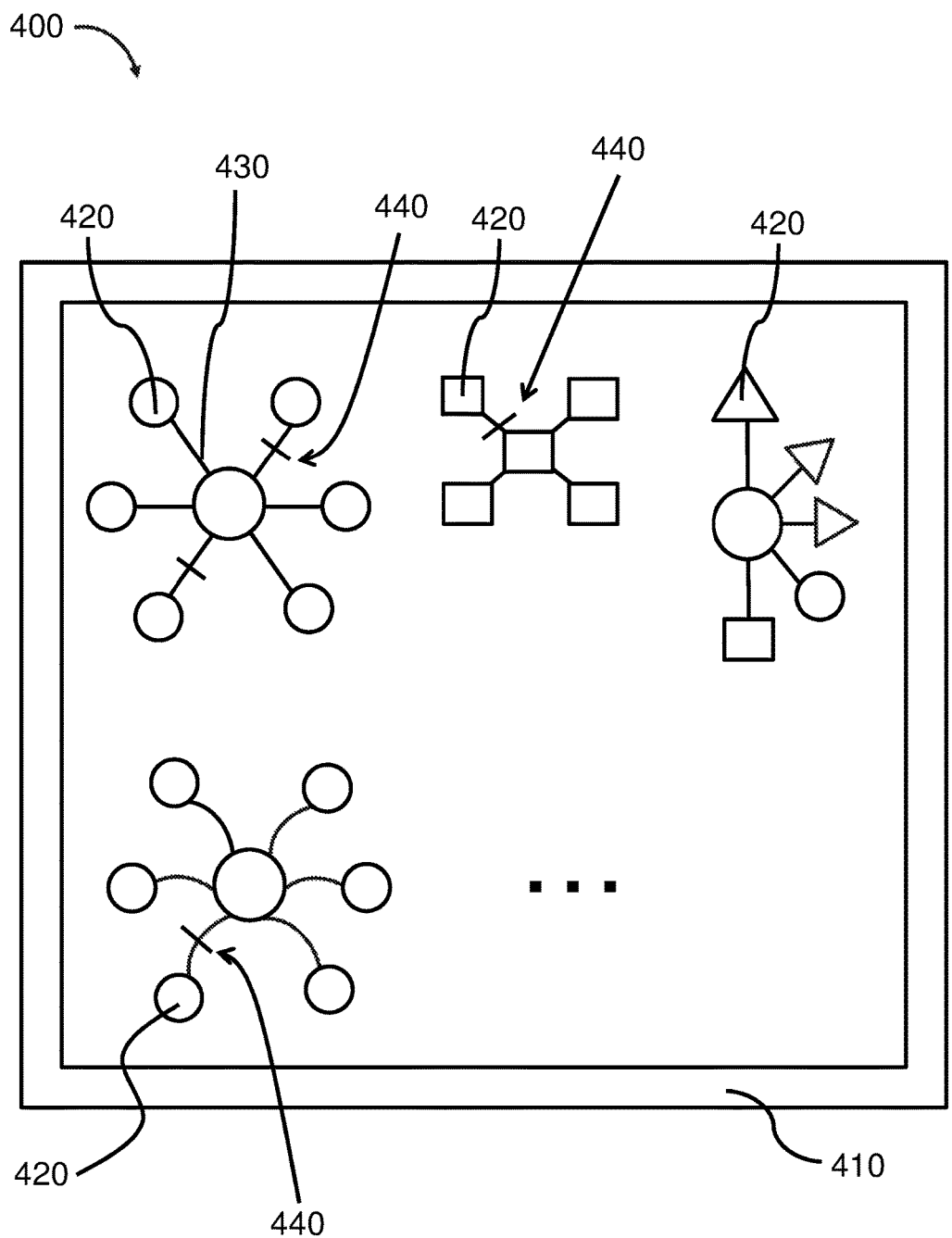
FIG. 4 shows a substrate with conductive patterns in accordance with another example embodiment.

FIG. 4 shows a non-conductive substrate with conductive patterns 400 in accordance with another example embodiment. The substrate 400 includes an electrically non-conductive substrate 410 and a plurality of electrical conductors disposed on a surface of the non-conductive substrate 410. The electrical conductors are connected together to form patterns of conductive lines 430 connected to conductive geometric shapes 420 located at ends of the conductive lines 430. A plurality of switches 440 are positioned between two of the conductive geometric shapes 420. As one example, the patterns have a star-shape, and a polygon-shape.

In an example embodiment, the electrical conductors are formed by a transfer foil process. An adhesive layer is partly applied to an electrically non-conductive substrate. After that, metal foil layers are applied via a transfer process to form patterns of conductive lines connected to conductive geometric shapes located at ends of the conductive lines on the substrate. Switches, for example, MEMS or optoelectronic switches are positioned between two of the geometric shapes by wire bonding or flip-chip bonding. At last, an electromagnetic interference shielding material is applied to reduce interference from external sources. The shielding material has sufficient mechanical robustness to withstand torsion and tension while maintaining its shielding properties.

In another example embodiment, the electrical conductors are formed by printing conductive ink on the electrically non-conductive substrate. The substrate is made of electrical non-conductive material that is preferably flexible and light weight, such as plastic, paper, card board, wood, glass, ceramics, fabrics, leather or a combination thereof. By way of example, the conductive ink is mixed with metal powers or metal flakes.

In another example embodiment, the electrical conductors are formed by applying a conductive sheet on the electrically non-conductive substrate followed by etching or laser process to remove unwanted areas. As one example, the unwanted areas are heated by the laser and evaporate, leaving the remaining areas to form a desired pattern.

Figure 5A:
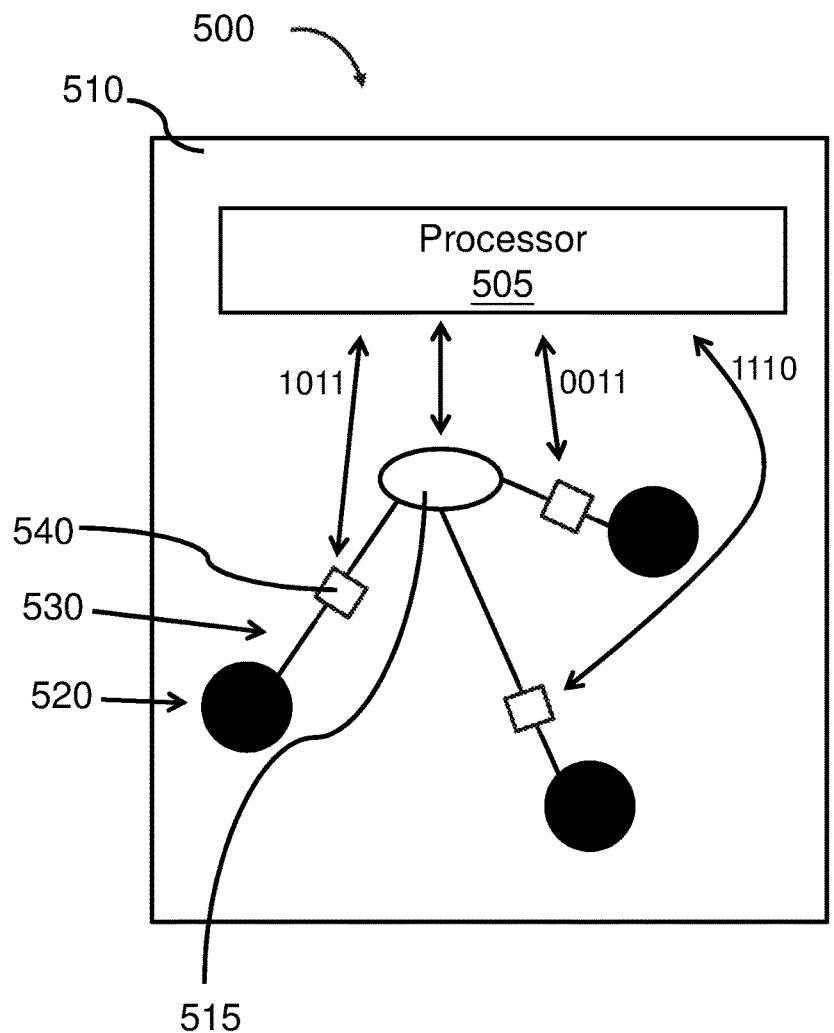
FIG. 5A shows a substrate with conductive patterns in accordance with an example embodiment.

FIG. 5A shows a non-conductive substrate with conductive patterns 500 in accordance with an example embodiment. The substrate 500 includes an electrically non-conductive substrate 510 and a plurality of electrical conductors disposed on a surface of the non-conductive substrate 510. The electrical conductors are connected together to form patterns of conductive lines 530 connected to conductive geometric shapes or touch points 520 located at ends of the conductive lines 530.

A coupling point 515 is disposed on the substrate 510 and is connected to the conductive lines 530. A plurality of switches 540 are positioned on each of the conductive lines and between the conductive geometric shapes 520 and the coupling point 515. The substrate 500 further includes a processor 505 that communicates with the switches 540 and the coupling point 515. The processor 505 can be powered by a built-in battery or through inductance. The switches are switchable between an open state and a closed state and are encoded by the processor 505. For example, the switches shown in FIG. 5A are encoded as "1011", "0011", and "1110".

In an example embodiment, the coupling point is located on an opposite side to the conductive geometric shapes. In another example embodiment, the coupling point is located on a same side as the conductive geometric shapes. The switches and the processor can be located on either side of the substrate or both sides of the substrate.

As one example, when a user places the substrate against or near a touchscreen display and places his/her finger on the coupling point of the substrate, the patterns formed on the substrate effect changes of an electric field at coordinates of the touchscreen display where the conductive lines and/or the conductive geometric shapes are located. In one example embodiment, the reader decodes the pattern of the substrate and generates readable data.

Figure 5B:
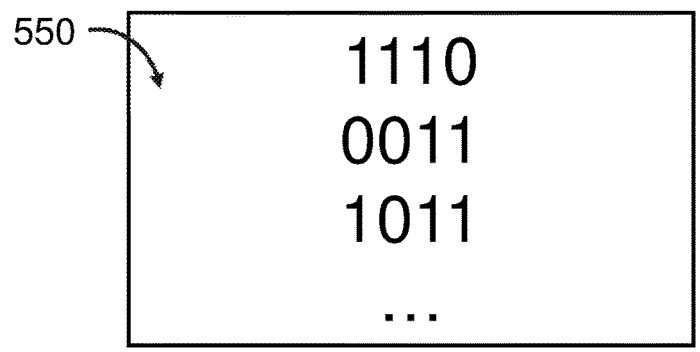
FIG. 5B shows a table that is decoded by a reader in accordance with an example embodiment.

By way of example, this readable data is shown as a table 550 as shown in FIG. 5B. One skilled in the art will appreciate that the data can be provided, stored, transmitted in various forms, and the table is provided as an illustration of the substrate providing readable data.

In one example embodiment, the substrate can attach to or be formed with an article, such as a smartphone or a business card or the article itself serves as a substrate. Further, example embodiments are not limited to a particular size or shape of substrate. For example, the substrate can be provided on or in handheld portable devices and integrated into electronic devices or non-electronic devices.

Figure 6:
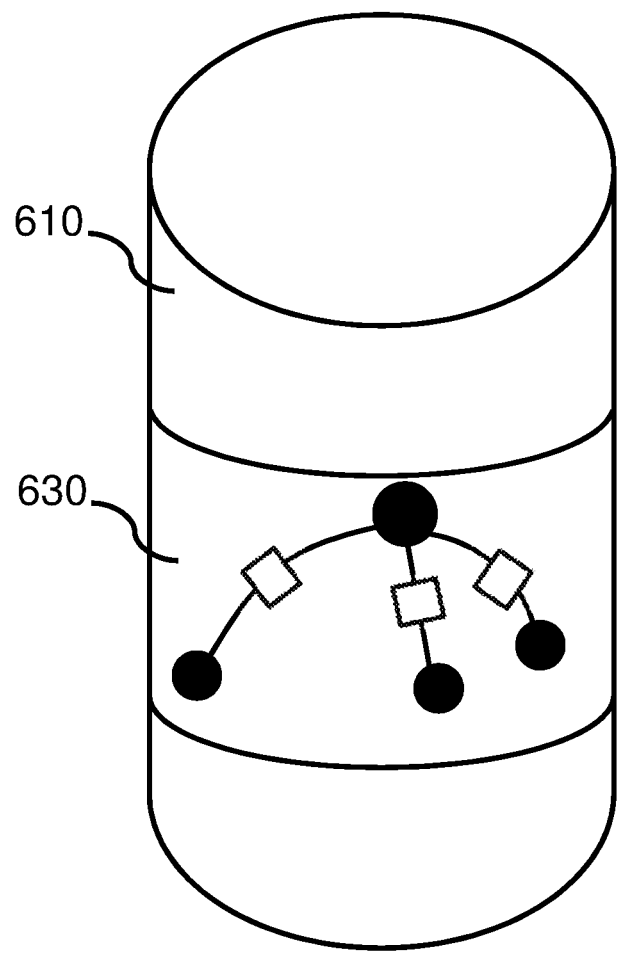
FIG. 6 shows a curved substrate with conductive patterns attached to a surface of an article in accordance with an example embodiment.

FIG. 6 shows an example of a curved non-conductive substrate with conductive patterns 630 attached to a surface of a cylinder-shaped article 610 in accordance with an example embodiment. The substrate 630 is flexible and may or may not be detachable from the article 610 and wraps partially around an exterior surface of the cylinder As one example, a smartphone includes a substrate of an example embodiment. As another example, a case or cover to a smartphone or other portable electronic device includes an example embodiment.

Figure 7:
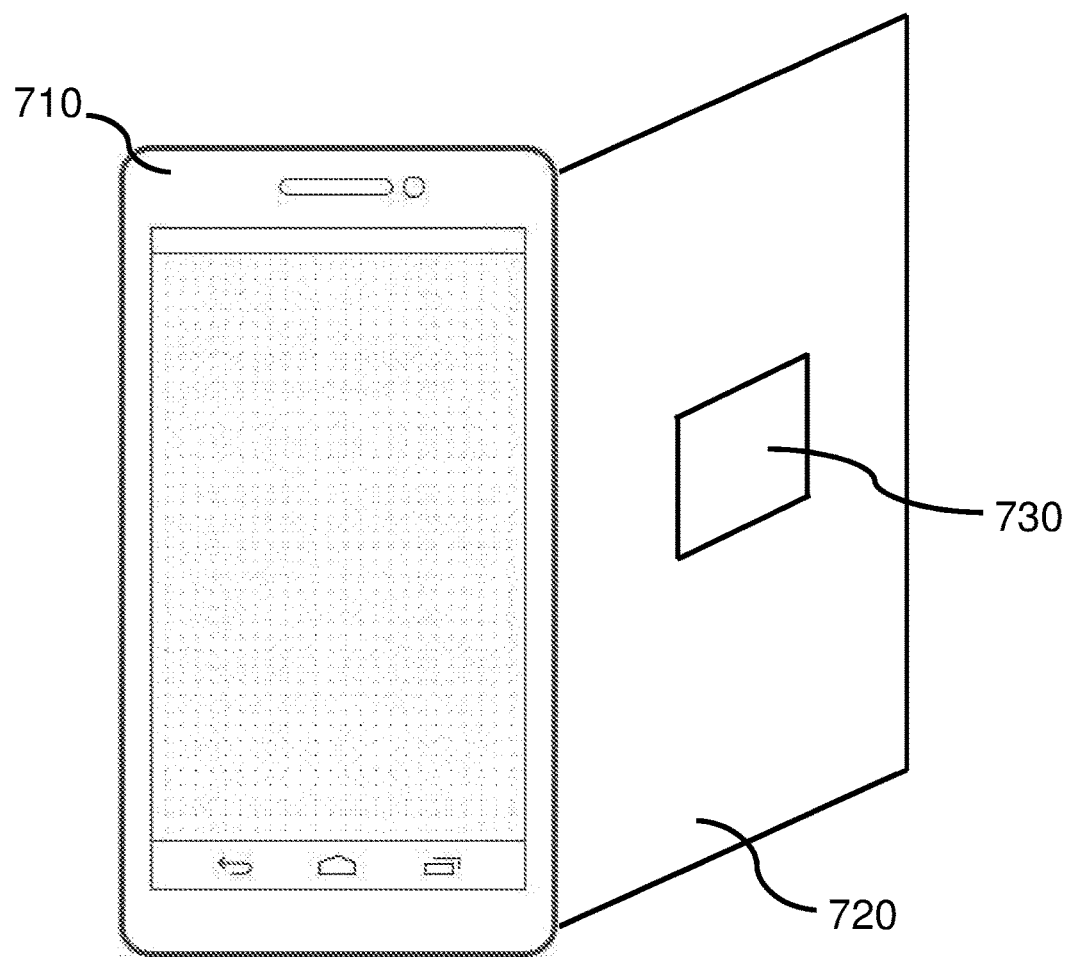
FIG. 7 shows a substrate with conductive patterns attached to a cover of a smartphone in accordance with an example embodiment.

FIG. 7 shows a smartphone 710 with a non-conductive substrate 730 in accordance with an example embodiment. By way of illustration, the substrate 730 is connected to or formed in a removable cover 720 that fits around the smartphone 710.

A substrate of example embodiments can be integrally formed into or with another device or removable or detachable from the device.

Figure 8A:
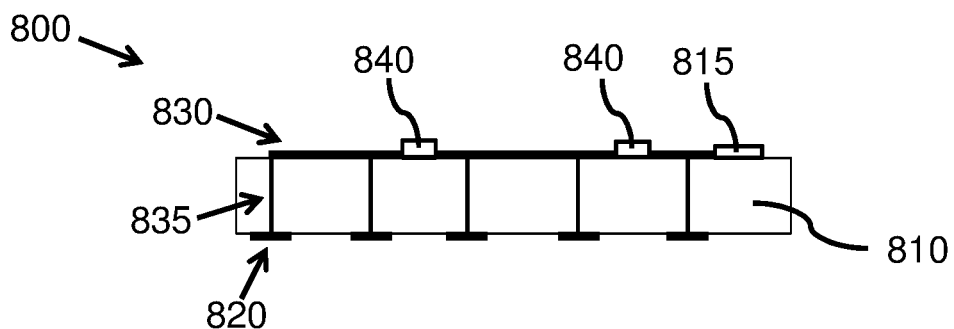
FIG. 8A shows a cross sectional view of a substrate with conductive patterns in accordance with an example embodiment.
Figure 8B:
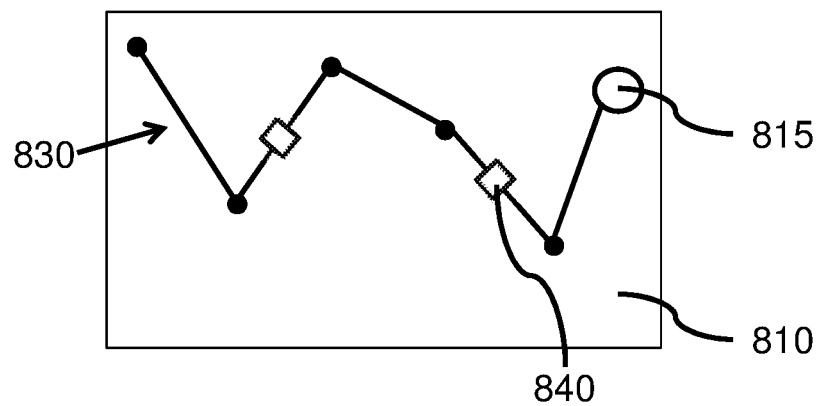
FIG. 8B shows a top view of a substrate with conductive patterns in accordance with an example embodiment.
Figure 8C:
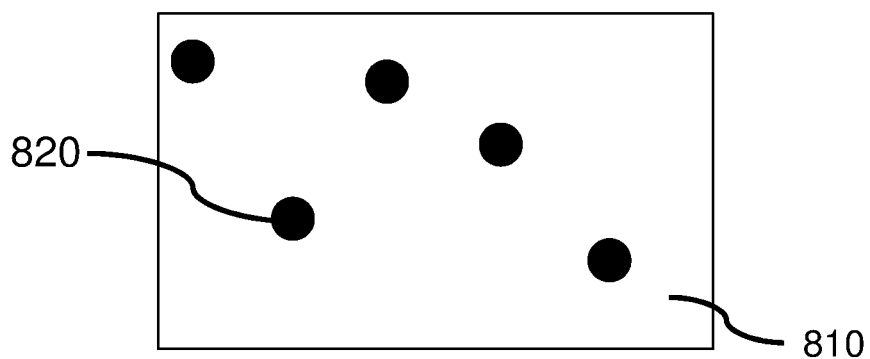
FIG. 8C shows a bottom view of a substrate with conductive patterns in accordance with an example embodiment.

FIG. 8A shows a cross sectional view of a non-conductive substrate with conductive patterns 800 in accordance with an example embodiment. FIG. 8B shows a top view of the substrate shown in FIG. 8A. FIG. 8C shows a bottom view of the substrate shown in FIG. 8A.

The substrate 800 includes an electrically non-conductive substrate 810 and a plurality of electrical conductors that are disposed on a top surface of the non-conductive substrate 810, on a bottom surface of the non-conductive substrate and inside the non-conductive substrate. The electrical conductors include a plurality of conductive geometric shapes 820 disposed on the bottom surface of the substrate, conductive lines 830 disposed on the top surface of the substrate and conductive vias 835 embedded inside the substrate.

One or more coupling points can be disposed on the surface of the substrate. For example, a coupling point 815 is disposed on the top surface of the substrate and is connected to the conductive lines 830. The conductive geometric shapes are connected to each other through the conductive vias or electrically conductive pathways 835 and the conductive lines 830. A plurality of switches 840 are positioned on the conductive lines on the top surface of the substrate. The switches are switchable between an open state and a closed state.

As one example, when a user places the substrate against or near a touchscreen display, information transmits from the substrate as the conductive shapes 820 activate and deactivate. For instance, when a user places his/her finger on the coupling point of the substrate to activate information transmission between the substrate and the touchscreen display, the geometric shapes formed on the bottom surface of the substrate effect changes of an electric field at coordinates of the touchscreen display where the conductive geometric shapes are located. As used herein, a "conductor" is an object or type of material that allows the flow of electricity. Examples of a conductive material include, but are not limited to, copper, silver, gold, aluminum, zinc, nickel, brass, conductive ink, and other conductive material (such as other metals, graphite, polymers, and semiconductors).

As used herein, a "monetary value" is an amount that may be applied to the purchase of goods and/or services. The monetary value may be more, less or equal to the amount paid for the card and may be positive or negative. The monetary value can be updated to reflect a transaction or other events.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

What is claimed is:

1. A planar card, comprising:
an electrically non-conductive substrate;
a plurality of electrical conductors disposed on a surface of the non-conductive substrate and connected together to form patterns of conductive lines connected to conductive geometric shapes located at ends of the conductive lines; and
a switch positioned between two of the conductive geometric shapes and switchable between an open state and a closed state;
wherein the conductive lines and the conductive geometric shapes form a first pattern that corresponds to a first unique identification of the planar card when the switch is in the open state;
wherein the conductive lines and the conductive geometric shapes form a second pattern that corresponds to a second unique identification of the planar card when the switch is in the closed state.

2. The planar card of claim 1, wherein the first and second patterns affect changes of an electric field at coordinates of a touchscreen display where the conductive lines and the conductive geometric shapes are located when the planar card is placed against the touchscreen display.

3. The planar card of claim 1, wherein the first pattern and the second pattern are shaped as one of a star-shape, and a polygon-shape.

4. The planar card of claim 1, wherein the switch switches from the open state to the closed state after a predetermined amount of time in order to change the planar card from having the first unique identification to having the second unique identification.

5. The planar card of claim 1, wherein the conductive geometric shapes include circles with a diameter of more than 0.2 centimeters.

6. The planar card of claim 1, wherein the switch is selected from a micro-electromechanical system (MEMS) device, bipolar junction transistors, field effect transistors, optoelectronic switches, digital relays and mechanical relays.

7. The planar card of claim 1, wherein the conductive lines include conductive ends that are shaped as one of a square, a circle, a triangle, a star and other polygon shapes.

8. The planar card of claim 1 further comprising:
a memory that stores a duration time that the planar card is located adjacent a touchscreen display of a reader.

9. A method executed by a reader to determine an identification of an electronic device, the method comprising:
reading, by the reader, patterns that are formed by conductive lines connected to conductive geometric shapes located at ends of the conductive lines on a non-conductive substrate of the electronic device when the electronic device is in contact with a touchscreen display of the reader;
determining, by the reader, an identification of the electronic device based on the patterns formed by the conductive lines connected to the conductive geometric shapes located at the ends of the conductive lines; and
displaying, by the reader and on the touchscreen display of the reader, the identification of the electronic device;
wherein the patterns include a plurality of switches positioned between the conductive geometric shapes and switchable between an open state and a closed state;
wherein the conductive lines and the conductive geometric shapes form a first pattern that corresponds to a first unique identification of the electronic device when the switch is in the open state;
wherein the conductive lines and the conductive geometric shapes form a second pattern that corresponds to a second unique identification of the electronic device when the switch is in the closed state.

10. The method of claim 9 further comprising:
changing the patterns and a unique identity of the electronic device by turning the switches on and off.

11. The method of claim 9, wherein a switch switches from the open state to the closed state after a predetermined amount of time in order to change the electronic device from having the first unique identification to having the second unique identification.

12. The method of claim 9 further comprising:
retrieving, by the reader, a first monetary value associated with the electronic device upon reading the first pattern formed by the conductive lines connected to the conductive geometric shapes located at the ends of the conductive lines; and
retrieving, by the reader, a second monetary value associated with the electronic device upon reading the second pattern formed by the conductive lines connected to the conductive geometric shapes located at the ends of the conductive lines.

13. The method of claim 9 further comprising:
changing a monetary value associated with the electronic device by opening and closing one or more of the plurality of switches in response to the electronic device being in contact with the touchscreen display of the reader.

14. The method of claim 9 further comprising:
recording, by the reader, a duration of time that the electronic device is located adjacent the touchscreen display of the reader; and
opening and closing one or more of the plurality of switches after expiration of a predetermined amount of the duration of time.

15. An electronic system, comprising:
a planar card that includes an electrically non-conductive substrate, a plurality of electrical conductors disposed on a surface of the non-conductive substrate and connected together to form patterns of conductive lines connected to conductive geometric shapes located at ends of the conductive lines, and a switch positioned between two of the conductive geometric shapes and switchable between an open state and a closed state; and
an electronic device with a touchscreen display that reads the patterns formed on the surface of the non-conductive substrate of the planar card when the planar card is in contact with the touchscreen display,
wherein the conductive lines and the conductive geometric shapes form a first pattern that corresponds to a first unique identification of the planar card when the switch is in the open state,
wherein the conductive lines and the conductive circles form a second pattern that corresponds to a second unique identification of the planar card when the switch is in the closed state.

16. The electronic system of claim 15, wherein the switch switches states in response to the planar card being in contact with the touchscreen display of the electronic device.

17. The electronic system of claim 15, wherein the switch switches states in response to the planar card being in contact with the touchscreen display for a predetermined amount of time.

18. The electronic system of claim 15, wherein the conductive geometric shapes include a circular shape with a diameter of more than 0.4 centimeters.

19. The electronic system of claim 15, wherein the patterns formed on the non-conductive substrate include one of a star-shape, a box-shape, and a polygon-shape.

20. The electronic system of claim 15 further comprising:
   a memory disposed on the planar card that stores a duration of time that the planar card is located adjacent the touchscreen display of a reader.

\* \* \* \* \*